United States Patent [19]

Lurie et al.

[11] 4,369,386

[45] Jan. 18, 1983

[54] ARRANGEMENT FOR LIQUID SUPPLY INTO THE ROTOR OF AN ELECTRIC MACHINE

[76] Inventors: Alexandr N. Lurie, Belgradskaya ulitsa, 6, korpus 2, kv. 237, Leningrad; Anatoly N. Anchukov, poselok Shexna II, ulitsa Energetikov, 19, Vologodskaya oblast; Alexandr A. Dukshtau, Basseinaya ulitsa, 111, korpus 3, kv. 34, Leningrad; Gleb S. Schegolev, Sinyavinskaya ulitsa, 12/49, kv. 29, Leningrad; Gennady A. Yablonsky, Kondratievsky prospekt, 67, korpus 2, kv. 13, Leningrad; Mikhail L. Steklov, ulitsa Ryleeva, 17-19, kv. 25, Leningrad, all of U.S.S.R.

[21] Appl. No.: 199,054

[22] Filed: Oct. 20, 1980

Related U.S. Application Data

[63] Continuation of Ser. No. 61,391, Jul. 27, 1979, abandoned.

[51] Int. Cl.$^3$ ............................................... H02K 9/00
[52] U.S. Cl. .................................... 310/54; 310/61
[58] Field of Search ............... 310/52, 54, 60 R, 61, 310/58, 59, 53, 64, 165, 65, 170, 57, 45; 62/505, 514; 310/90, 261; 277/81 R, 81 S, 187

[56] References Cited

U.S. PATENT DOCUMENTS

| | | | |
|---|---|---|---|
| 3,335,303 | 8/1967 | Lurie et al. | 310/54 |
| 3,626,717 | 12/1971 | Lorch | 62/505 |
| 3,729,641 | 4/1973 | Sato | 310/54 |
| 3,733,501 | 5/1973 | Heller | 310/54 |
| 3,831,046 | 8/1974 | Curtis | 310/54 |
| 3,968,388 | 7/1976 | Lambrecht | 310/53 |
| 4,228,374 | 10/1980 | Elsel | 310/64 |

Primary Examiner—R. Skudy
Attorney, Agent, or Firm—Holman & Stern

[57] ABSTRACT

An arrangement for liquid supply into the rotor of an electric machine comprises a bush mountable on the rotor shaft and having a duct for passing the liquid therethrough and projecting circular partitions, and a pressure, drain, and a collecting circular chambers embracing the bush. These chambers are formed by interconnected stationary circular partitions mounted with a clearance relative to the bush circular partitions. Each of the clearances of the pressure and of the collecting circular chambers is sealed by a sealing plate made of resilient rubberlike material, mounted in these chambers and fixed on the stationary circular partition or on the bush partition, and contacting with its operating surface with another one of these partitions.

4 Claims, 8 Drawing Figures

ARRANGEMENT FOR LIQUID SUPPLY INTO THE ROTOR OF AN ELECTRIC MACHINE

This is a continuation of an application Ser. No. 061,391 filed July 27, 1979.

FIELD OF THE INVENTION

The present invention relates to electric machine engineering, and more particularly to arrangements for liquid supply into the rotors of electric machines.

The proposed arrangement for liquid supply into the rotor of an electric machine can most advantageously be used in electric machines when it is required to intensify cooling or to increase machine utilization factor (Esson factor) which characterizes efficiency of utilization of active materials.

BACKGROUND OF THE INVENTION

It should be noted that recently it has become necessary to develop assemblies operating under low water pressures. Of these assemblies, capsule ones are the most efficient. These are the assemblies wherein a rotor, a turbine, and all auxiliary units are housed in a single shell or capsule. Since the sizes of a generator in such assemblies are considerably less than those of conventional hydraulic turbines, its normal operation requires a substantial increase in cooling intensity.

At present, in that field of engineering a great number of arrangements for cooling an excitation winding and rotor pole cores is known.

For example, known in the art are arrangements for rotor air cooling, comprising a powerful fan with an electric motor on the same shaft, mounted inside the head portion of the capsule. Such an arrangement thereof along with other auxiliary units tends to be rather complicated in design.

Some manufacturers practice cooling of capsule generators by compressed air.

The disadvantage of such a cooling system consists in that it requires sealing of the entry into the capsule as well as designing turbine and bearing seals so that the compressed air pressure would not force out the air into the used air stream through turbine seals and would not squeeze oil out from bearing reservoirs. The aforementioned requirements are also rather difficult to be obtained when designing the arrangement.

However, cooling with compressed air complicates seriously generator maintenance. Thus, to allow the personnel to enter the capsule to inspect or repair turbine or generator units contained therein, it is necessary that the pressure inside the capsule should be released and the fan stopped, this being allowable only for a short period of time in the course of assembly operation. A more prolonged stay of the personnel inside the capsule leads to forced stops of the assembly, which results in considerable degradation of its operating conditions.

It is known to use water cooling for stators and rotors of generators of capsule assemblies.

Water has a higher thermal capacity as compared to air and its heat transfer capability is many times over that of air.

Therefore, circulating along hollow conductors of stator and rotor windings, water provides very efficient heat removal.

Known in the art are arrangements for supplying water and oil in the system of a hydraulic turbine assembly, comprising two concentric pipes and a water header directly adjoining the generator shaft end with a distribution bush fixed thereupon. Water is supplied through the bush to the shaft bore connected with rotor windings of the generator. A water header comprises a pressure, a collecting and a drain chambers formed by interconnected stationary circular partitions. To separate the pressure chamber from the collecting and drain chambers, the casing of the water header is provided with circular and end seals sealing end clearances between the body and the rotatable bush.

The principal disadvantage of these arrangements consists in that they fail to provide self-adjustment of pressing the seals to the clearance forming members and, as a result, the arrangements have a low reliability. The absence of the water in the water header chambers even for a short period of time therefore results in a quick overheating and breaking of seals, the remains of broken seals may clog the hollow conductors of rotor windings, which, in turn, results in breakdown of the assembly.

Also known in the art is an arrangement for supplying cooling liquid into the rotor of an electric machine (cf. U.S. Pat. No. 3,335,303). The arrangement comprises two coaxial pipe members mounted on the rotor shaft, said pipe members forming a rotary part of the arrangement. The outer pipe member in the form of a bush is embraced by a pressure, a collecting, and a drain circular chambers formed by interconnected radial circular partitions. The radial partitions are mounted stationary and have a small radial clearance relative to the outer pipe member, eliminating a contact of stationary and rotary parts. The body is coupled with the rotary pipe members by means of antifriction bearings and rings.

Two coaxial pipes are required to provide thermal insulation between the cold liquid flow delivered from the pressure chamber to the inner pipe, and the hot flow contained in the collecting and drain chambers.

However, when using such arrangement for liquid supply into the rotor of an electric machine, there occur rather significant leakages of water from one chamber into the other through radial clearances between stationary circular partitions and the rotary pipe member. These leakages bypass the generator rotor and penetrate directly from the pressure circular chamber into the collecting chamber and may account to more than 50 percent of the total coolant liquid flow.

To compensate for increased water leakages and to ensure the sufficient cooling liquid flow, the pumps of increased capacity are required.

Furthermore, the cold water of leakages mixes in the collecting chamber with the hot water flowing from the rotor, decreases overall temperature of water in the collecting pipeline whereon temperature indicating instruments are installed, and thus distorts measurements of thermal state of the rotor.

Sufficient decrease in the amount of leakage is impracticable due to the fact that the clearances in the referred construction cannot be formed infinitely small, since the clearance dimensions are not stable due to temperature strains of the seal material of the stationary radial partitions.

Another disadvantage of this arrangement is the difficulty of its assembling, since when the two pipe members are mounted coaxially it appears to be difficult to mount seals in rather inaccessible spots inside the shaft.

SUMMARY OF THE INVENTION

It is an object of the present invention to provide the arrangement for liquid supply into the rotor of an electric machine, wherein water leakages through seals from one chamber into another are minimized, and thereby to increase operational reliability.

It is another object of the present invention to simplify assembling and mounting of the arrangement.

Still another object of the present invention is to provide selfadjustment of pressing of a sealing member and consequently, to decrease its wear, thus increasing service life of the arrangement.

The principal object of the present invention is to provide an arrangement for liquid supply into the rotor of an electric machine, wherein partitions between a pressure, a collecting, and a drain chambers are constructed so as to minimize liquid leakages from one chamber into another.

With these and other objects in view there is provided an arrangement for liquid supply into the rotor of an electric machine, comprising a bush mountable onto the rotor shaft and provided with a duct for passing the liquid therethrough, and a pressure, drain, and a collecting circular chambers embracing the bush and formed by interconnected stationary circular partitions mounted with clearances relative to the bush, wherein, according to the invention, the bush is made with projecting circular partitions forming, in conjunction with the stationary circular partitions, said clearances sealed by sealing plates made of resilient rubberlike material and mounted in the pressure and collecting chambers, each of the sealing plates being fixed on one of the circular partitions forming the clearance, and being held in contact, by its surface, with another partition.

Such a design of the bush with projecting circular partitions forming a clearance relative to the stationary circular partitions permits to mount the sealing plate so as to overlap the clearance.

As the bush rotates, the clearance sealing plate fixed to one of the circular partitions slides with the operating surface of its free portion over the other circular partition.

When the sealing plates are fixed on the stationary circular partitions, these sealing plates, as the bush rotates, are sliding with their free surfaces over the lateral surfaces of the bush circular partitions.

In case the sealing plates are fixed on the bush circular partitions, these sealing plates rotating with the bush, slide with their free surfaces over the lateral surfaces of the stationary circular partitions.

The sealing plate being mounted in the pressure or in the collecting chamber, tight pressing of the operating surface of this plate against the partition is ensured, thereby decreasing water leakages through the clearance into the adjacent chambers and providing self-adjustment of pressing force according to water pressure in the chamber.

Therewith, the free portion of the plate, under the pressure of the water contained in the chamber, is tightly pressed with its free surface against the partition, thereby decreasing water leakages through the clearance into adjacent chambers.

It is advisable to form grooves on the contact surfaces of the sealing plates to supply liquid from the chambers to the contacting surfaces to moisten them.

The depth of the grooves for liquid supply is to be sufficient to provide reliable and complete moistening of the sealing plate free surface and of the circular partition lateral surface rubbing and contacting as the bush rotates. Moistening of the sealing plate operating surface and the circular partition lateral surface, rubbing and contacting as the bush rotates, eliminates wear of the sealing plates due to dry or semidry friction, and thus increases their service life.

The grooves for supplying liquid from the chambers to the contacting surfaces are advisable to be formed radially. Radial grooves are easier in manufacturing.

It is advisable that the stationary circular partitions should have an h-shaped form in cross-section. An h-shaped cross-sectional form of the stationary circular partitions makes it possible, on the one hand, to simplify assembling and manufacturing of the whole arrangement due to facilitating fixing of the stationary circular partitions together, and on the other hand, to fix the sealing plates so that they seal clearances between the stationary circular partitions and the bush circular partitions.

The proposed arrangement for liquid supply into the rotor of an electric machine minimizes water leakages, increases reliability of the arrangement, and decreases its metal input.

Aforementioned and other objects and advantages of the proposed invention will become more apparent upon consideration of the following detailed description of its preferred embodiments taken in conjunction with the accompanying drawings in which:

BRIEF DESCRIPTION OF THE DRAWINGS

FIG. 5 shows a sealing plate to be fixed on the stationary circular partition, having straight grooves to supply liquid from the chamber to contacting surfaces, according to the invention;

DETAILED DESCRIPTION OF THE INVENTION

Figure 1:
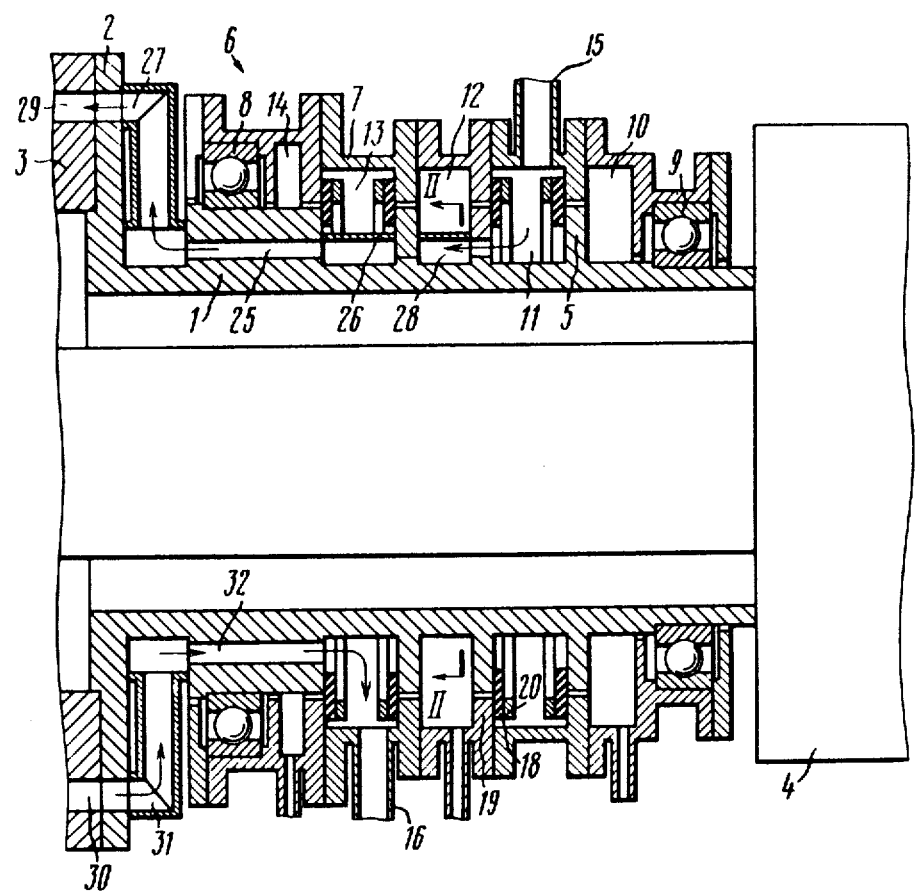
FIG. 1 shows an arrangement for liquid supply into the rotor of an electric machine, according to the invention longitudinal section.
Figure 2:
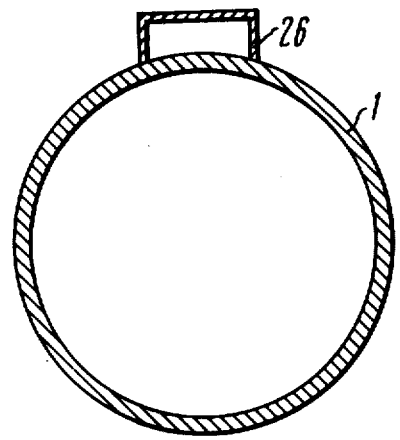
FIG. 2 is a section taken along the line II—II of FIG. 1.

The arrangement for liquid supply into the rotor of an electric machine includes a bush 1 (FIG. 1) fixed with its flange 2 on the end face of a rotor shaft 3 by means of bolts (not shown). The bush 1 is at the same time an outer bush of an oil header 4 and is a component of the arrangement for liquid supply. The bush 1 is formed with projecting circular partitions 5. A casing 6 is formed by a number of circular h-shaped in cross-section partitions 7 fixed together with their outer portions by means of bolts (not shown). The casing 6 is supported on the bush 1 by means of two ball bearings 8 and 9 disposed in both sides of the casing, and prevented from rotation by a stop (not shown). The circular h-shaped in cross-section partitions 7 coupled with the bush 1 form a drain chamber 10, a pressure chamber 11, a drain chamber 12, a collecting chamber 13, and a drain chamber 14. In the pressure chamber 11 there is mounted a conduit 15 for feeding cooling liquid, in the collecting chamber 13 there is mounted a conduit 16 for draining waste liquid, and in the drain chambers there are mounted conduits 17 for removal of leakages getting into these chambers from the adjacent chambers.

The stationary circular h-shaped in cross-section partitions 7 are mounted with a clearance relative to the projecting circular partitions 5 of the bush 1. The amount of the clearance exceeds those of clearances in bearing units coupling rotary and stationary parts of the arrangement with consideration for temperature strains in different elements of the arrangement, and is approximately equal to 1 mm.

Each circular clearance is sealed with a circular sealing plate 18 about 4 mm thick fixed on one of the partitions. The sealing plates 18 are mounted inside the pressure chamber II and the collecting chamber 13 at both sides thereof. The circular sealing plate 18 is made of a resilient rubberlike material, i.e. of a resilient material of high pliability, namely, of rubber. The sealing plates made of natural rubber or resilient polymeric materials can be used as well.

Figure 3:
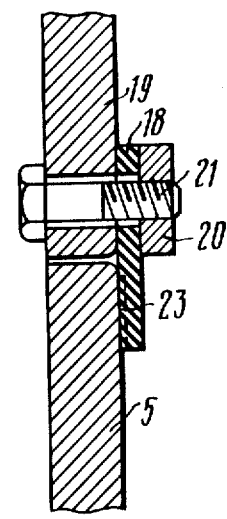
FIG. 3 is an enlarged sectional view of fixing of the sealing plate.

One of the embodiments of fixing of the circular sealing plate 18 is shown in FIG. 3.

The sealing plate 18 is fixed on a projection 19 of the h-shaped in cross-section partition 7 by means of a pressing washer 20 and bolts 21, and is forced against the projecting circular partition 5 of the bush 1.

Figure 4:
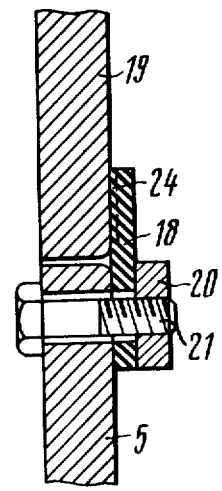
FIG. 4 shows another embodiment of fixing of the sealing plate, sectional view.

Another embodiment of fixing of the circular sealing plate 18 is shown in FIG. 4. The sealing plate 18 is fixed on the projecting circular partition 5 of the bush 1 by means of the pressing washer 20 and bolts 22, and is forced against the circular projection 19 of the h-shaped in cross-section partition 7.

On the sealing plate 18 fixed on the circular projection 19 of the h-shaped in cross-section partition 7, over its circumference there are formed inclined straight grooves 23 (FIG. 5) to supply liquid from the pressure chamber 11 and the collecting chamber 13 to the contacting surfaces of this plate and of the projecting circular partition 5 of the bush 1. The depth of the grooves is of about 1 mm, which provides reliable liquid moistening of contacting surfaces as the bush 1 rotates and, hence, increases service life of the sealing plate 18.

Figure 6:
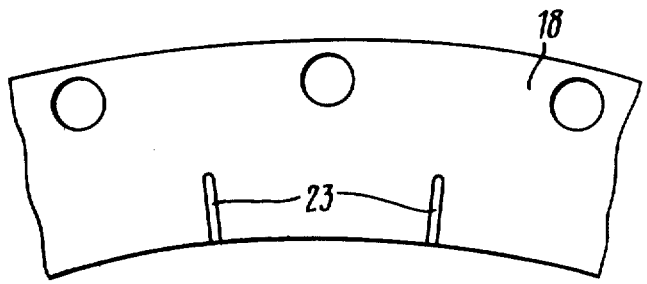
FIG. 6 shows another arrangement of the grooves on the sealing plate to be fixed on the stationary circular partition.

Another embodiment of forming the grooves on the sealing plate 18 fixed on the circular projection 19 of the partition 7 is shown in FIG. 6 wherein similar elements are designated by the same reference numerals.

The grooves are formed radially. Such an arrangement of the grooves is easier in manufacturing.

Figure 7:
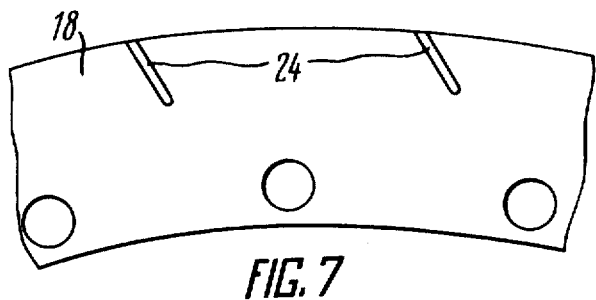
FIG. 7 shows a sealing plate to be fixed on the bush circular partition, having straight grooves to supply liquid from the chamber to contacting surfaces, according to the invention.

When the sealing plates 18 are fixed on the projecting circular partitions 5 of the bush 1 the straight inclined grooves 24 are formed over circumference of the plate from the outer radius of the plate 18 (FIG. 7) and serve to deliver liquid from the pressure chamber 11 and the collecting chamber 13 to contacting surfaces of this plate and of the circular projection 19 of the partition 7.

Figure 8:
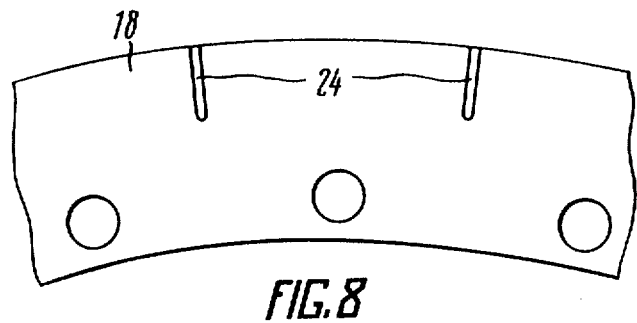
FIG. 8 shows another arrangement of the grooves on the sealing plate to be fixed on the bush circular partition.
Figure 6:
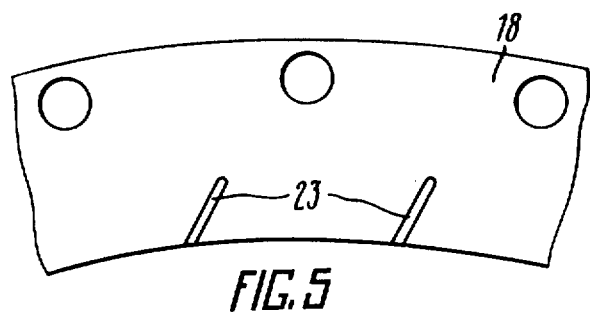

Another embodiment of forming the grooves on the sealing plate 18 fixed on the projecting circular partitions 5 of the bush 1 is shown in FIG. 8 in which similar elements are also designated by the same reference numerals. In this embodiment the grooves 24 are formed radially.

A channel for delivering coolant liquid from the pressure chamber 11 to the rotor of the electric machine is formed by openings 25 in the projecting circular partitions 5 (FIG. 1) of the bush 1, by n-shaped partitions 26 fixed between the circular partitions 5, and by a pipe 27.

The arrangement operates as follows. As the rotor of the electric machine with the bush 1 fixed thereon rotates, cooling water is fed from a pump along a pipeline (not shown) through the conduit 15 to the pressure chamber 11, and through the openings 25 in the circular partitions 5, through channels 28 formed by the n-shaped partitions 26, and through the pipe 27 flows into a bore 29 of the rotor 2, connected with a rotor cooling system (not shown). Having passed the rotor the heated water flows from an opening 30 in the rotor, passes along a pipe 31 and an opening 32 in the circular partition 5, and enters the collecting chamber 13 wherefrom it flows along the pipeline back to the pump. Water leakages through the circular sealing plates 18 are collected in the drain chambers 10, 12, and 14 and through the conduits 17 are delivered to a drain.

The circular sealing plates 18 fixed on the circular projections 19 of the partitions 7 slide with their operating surfaces over the surfaces of the rotating circular partitions 5 of the bush 1.

The water, getting into the grooves 23 formed in the sealing plate 18, moistens friction surfaces, thereby decreasing their rapid wear.

When the circular sealing plates are fixed on the rotating circular partitions 5, these plates, as they rotate, slide with their operating surfaces over the lateral surfaces of the circular projections 19 of the partitions 7.

The water, getting into the grooves 24 formed in the sealing plate 18, moistens friction surfaces, thereby decreasing their rapid wear.

Therewith, under the pressure of water in the pressure chamber 11 and in the collecting chamber 13 the sealing plates 18 are forced with their operating surfaces against partition surfaces over which they slide. Intimate mating of the sealing plates with the partitions is provided due to making them of resilient rubberlike materials, namely of rubber.

When the coolant water supply is cut off, the force of pressing of the operating surfaces of the sealing plates 18 against the lateral surfaces of the partitions is reduced, thus preventing these sealing plates from rapid wear without moistening their operating surfaces as the rotor rotates.

While the present invention has been described hereinabove in terms of particular embodiments, it is not intended that the invention be limited to the disclosed embodiments and numerous modifications and variations may be made thereof within the spirit and scope of the invention as set forth in the appended claims.

What is claimed is:

1. In an electric machine having a rotor with a shaft, an arrangement for supplying liquid to the rotor comprising:
   a bush having a duct for passing the liquid therethrough and projecting circular partitions, mountable onto the rotor shaft;
   pressure, drain, and a collecting circular chambers, adapted, respectively, to feed the liquid, to remove leaking liquid and to remove used liquid, formed by interconnected stationary circular partitions and embracing said bush and mounted with clearances relative to said partitions of said bush; and sealing plates of resilent rubberlike material sealing said clearances and mounted in said pressure and collecting circular chambers, each of said sealing plates being fixed on each one of said clearance-forming circular partitions and held in contact, by surfaces of the sealing plates, with said circular partitions of said bush.

2. An arrangement as claimed in claim 1 wherein said stationary partitions have an h-shaped form in cross-section.

3. An arrangement as claimed in claim 1 wherein grooves are formed on the contact surfaces of said sealing plates to deliver liquid from said pressure and collecting circular chambers to the contacting surfaces for their moistening.

4. An arrangement as claimed in claim 3 wherein said grooves extend radially with respect to said bush.

* * * * *